United States Patent
Kwon et al.

(10) Patent No.: US 9,385,849 B2
(45) Date of Patent: Jul. 5, 2016

(54) METHOD AND APPARATUS FOR TRANSMITTING AND RECEIVING A SIGNAL IN A WIRELESS COMMUNICATION SYSTEM THAT SUPPORTS PLURAL COMPONENT CARRIERS

(75) Inventors: Yeong Hyeon Kwon, Anyang-si (KR); So Yeon Kim, Anyang-si (KR); Sung Ho Moon, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 13/514,244

(22) PCT Filed: Jul. 14, 2010

(86) PCT No.: PCT/KR2010/004570
§ 371 (c)(1),
(2), (4) Date: Jun. 6, 2012

(87) PCT Pub. No.: WO2011/071223
PCT Pub. Date: Jun. 16, 2011

(65) Prior Publication Data
US 2012/0243498 A1  Sep. 27, 2012

Related U.S. Application Data

(60) Provisional application No. 61/267,084, filed on Dec. 7, 2009, provisional application No. 61/267,779, filed on Dec. 8, 2009, provisional application No. 61/328,616, filed on Apr. 27, 2010.

(51) Int. Cl.
*H04L 5/00* (2006.01)
*H04W 72/02* (2009.01)
(Continued)

(52) U.S. Cl.
CPC .......... *H04L 5/0053* (2013.01); *H04L 5/00* (2013.01); *H04L 5/001* (2013.01); *H04L 5/0091* (2013.01)

(58) Field of Classification Search
CPC ..... H04L 5/0007; H04L 5/001; H04L 5/0098; H04W 72/042
USPC ......... 370/328–330, 336, 338, 340–345, 431, 370/436, 480, 482; 455/434, 450
See application file for complete search history.

(56) References Cited

U.S. PATENT DOCUMENTS

2010/0195583 A1 * 8/2010 Nory et al. ............... 370/329
2010/0227569 A1 * 9/2010 Bala et al. ................. 455/73
(Continued)

FOREIGN PATENT DOCUMENTS

| EP | 2124368 A1 | 11/2009 |
|---|---|---|
| WO | WO 2008/056425 A1 | 5/2008 |
| WO | WO 2009/116562 A1 | 9/2009 |

OTHER PUBLICATIONS

Alcatel-Lucent et al., "Discussion of Carrier Indicator Signalling in Carrier Aggregation Scenario," 3GPP TSG RAN WG1 #58bis Meeting, R1-09-3767, Agenda Item 7.2.2 LTE-A, PDCCH: Meaning of CIF, Miyazaki, Japan, Oct. 12-16, 2009, pp. 1-3.

(Continued)

*Primary Examiner* — Un C Cho
*Assistant Examiner* — Peian Lou
(74) *Attorney, Agent, or Firm* — Birch, Stewart, Kolasch & Birch, LLP

(57) ABSTRACT

The present invention relates to a method for receiving a terminal signal in a wireless communication system that supports plural component carriers, the method comprising: receiving a subframe including a plurality of OFDM symbols from a base station (BS); and receiving identification information indicative of a particular component carrier, from one or more consecutive OFDM symbols located at the front of the subframe, wherein the identification information indicative of the particular component carrier includes a carrier offset value with respect to a reference component carrier.

11 Claims, 10 Drawing Sheets

(51) Int. Cl.
*H04W 72/04* (2009.01)
*H04W 48/12* (2009.01)
*H04W 52/14* (2009.01)
*H04W 72/12* (2009.01)
*H04W 74/02* (2009.01)
*H04L 1/16* (2006.01)
*H04L 27/26* (2006.01)

(56) References Cited

U.S. PATENT DOCUMENTS

| | | |
|---|---|---|
| 2010/0232373 A1* | 9/2010 | Nory et al. ............ 370/329 |
| 2010/0322158 A1* | 12/2010 | Lee et al. ............ 370/329 |
| 2011/0002282 A1 | 1/2011 | Inoue et al. |
| 2011/0310856 A1* | 12/2011 | Hariharan et al. ............ 370/336 |
| 2013/0010964 A1* | 1/2013 | Fong et al. ............ 380/277 |
| 2013/0201921 A1 | 8/2013 | Chen et al. |

OTHER PUBLICATIONS

Alcatel-Lucent, "Component Carrier Indication for Bandwidth Extension in LTE-A," 3GPP TSG-RAN WG1 #58, R1-093362, Agenda Item 15.4, Shenzhen, China, Aug. 24-28, 2009, pp. 1-5.

Ericsson et al., "PHICH for Carrier Aggregation," G3PP TSG-RAN WG1 #58bis, R1-094272, Agenda Item 7.2.2.2, Miyazaki, Japan, Oct. 12-16, 2009, 3 pages.

LTE-Advanced Rapporteur (NTT Docomo), "TP for TR36.814 on Downlink Control Signalling for Carrier Aggregation," 3GPP TSG RAN WG1 Meeting #59, R1-094959, Agenda Item 7.2, Jeju, Korea, Nov. 9-13, 2009, 3 pages.

"Carrier indication and CIF in PDCCH", 3GPP TSG RAN WG1 Meeting #59bis, R1-100546, Jan. 18-22, 2010, 3 pages.

"Carrier indicator for field related issues for cross-carrier scheduling in multiple carrier aggregation", 3GPP TSG RAN WG1 #59b, R1-100213, Jan. 18-22, 2010, 6 pages.

"Carrier indicator for LTE-A", 3GPP TSG RAN WG1 meeting #59, R1-094538, Nov. 9-13, 2009, 4 pages.

Catt, "Impact of cross-carrier scheduling," 3GPP TSG-RAN WG2 #68, R2-096500, Jeju, Korea, Nov. 9-13, 2009, pp. 1-5.

\* cited by examiner

METHOD AND APPARATUS FOR TRANSMITTING AND RECEIVING A SIGNAL IN A WIRELESS COMMUNICATION SYSTEM THAT SUPPORTS PLURAL COMPONENT CARRIERS

CROSS REFERENCE TO RELATED APPLICATIONS

This application is the National Phase of PCT/KR2010/004570 filed on Jul. 14, 2010, which claims priority under 35 U.S.C. 119(e) to U.S. Provisional Application Nos. 61/267,084 filed on Dec. 7, 2009, 61/267,779 filed on Dec. 8, 2009 and 61/328,616 filed Apr. 27, 2010, all of which are hereby expressly incorporated by reference into the present application.

FIELD OF THE INVENTION

The present invention relates to a wireless communication system supporting multiple component carriers (CCs), and more particularly to a method for transmitting and receiving component carrier (CC) identification information according to carrier scheduling.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like. In a mobile communication system, a user equipment (UE) may receive information from a base station (BS) via downlink, and may transmit information to the base station (BS) via uplink. The information that is transmitted and received to and from the UE includes data and a variety of control information. A variety of physical channels are used according to categories and usages of transmission (Tx) and reception (Rx) information of the UE.

In a mobile wireless communication system, a channel is not constant between a transmitter and a receiver. Thus, it is necessary to frequently measure the channel between a transmission (Tx) antenna and a reception (Rx) antenna. When a predefined signal is transmitted and received to measure the channel, the receiver may determine the amplitude decrease and phase shift of the channel using the predefined signal and may feed back the determined information to the transmitter. In addition, the receiver may detect and decode data information reliably based on the determined information. The signal predefined between the transmitter and the receiver may be referred to as a reference signal, a pilot signal, or a sounding reference signal (SRS).

As a representative example of a wireless communication system of the present invention, a $3^{rd}$ Generation Partnership Project Long Term Evolution (3GPP LTE) communication system will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS is broadly made up of a User Equipment (UE) 10, base stations (or eNode-Bs) 11, and a mobility management entity MME)/system architecture evolution (SAE) gateway 12 which is located at an end of a network (E-UTRAN) and is connected to an external network. Generally, the base stations 11 can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth. The LTE-A system is aimed at supporting a broadband of a maximum of 100 MHz, and to this end, the LTE-A system is designed to use a carrier aggregation or bandwidth aggregation technique using a plurality of frequency blocks. Carrier aggregation employs a plurality of frequency blocks as one big logical frequency band in order to use a wider frequency band. A bandwidth of each frequency block may be defined based on a bandwidth of a system block used in the LTE system. Each frequency block is transmitted using a component carrier. Multiple carriers may also be referred to as carrier aggregation or bandwidth aggregation.

DETAILED DESCRIPTION OF THE INVENTION

Technical Problem

Accordingly, the present invention is directed to a method and apparatus for transmitting and receiving signals in a wireless communication system supporting multiple carriers that substantially obviate one or more problems due to limitations and disadvantages of the related art. An object of the present invention is to provide a method for enabling a base station (BS) to use an offset value as identification information regarding a specific carrier transmitted to a user equipment (UE) when the BS performs the scheduling operation to allocate carriers to a plurality of UEs belonging to the system.

Another object of the present invention is to provide a method for determining whether the corresponding carrier belongs to uplink or downlink using identification information of a specific carrier.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving a signal by a user equipment (UE) in a wireless communication system supporting multiple component carriers (CCs), the method including receiving a subframe including a plurality of OFDM symbols from a base station (BS); and receiving identification information indicating a specific component carrier (CC) from one or more contiguous OFDM symbols located in the front of the subframe, wherein the identification information indicating the specific component carrier includes a carrier offset value centering around a reference component carrier.

The identification information of the specific carrier may be transmitted through a carrier indication field (CIF).

The method may further include receiving index mapping information related to an index mapping rule of multiple component carriers used in the user equipment according to carrier scheduling, from the base station, wherein the user equipment obtains location information of the specific carrier using the index mapping information and identification information of the specific carrier.

The index mapping rule of the multiple component carriers may include a sequentially indexed mapping rule in which indexing is performed considering whether the multiple component carriers may correspond to uplink or downlink, and an arbitrarily indexed mapping rule in which indexing is performed without discriminating between uplink and downlink.

The sequentially indexed mapping rule considering whether the multiple component carriers correspond to uplink or downlink includes a first index mapping scheme in which an uplink component carrier is mapped to a low index and a downlink component carrier is mapped to a high index, or an uplink component carrier is mapped to a high index and a downlink component carrier is mapped to a low index.

If the carrier scheduling of the base station is performed in units of a carrier group, a reinterpretation process is performed in which the identification information indicating the specific component carrier contained in a first component carrier (CC) group indicates a specific component carrier (CC) contained in a second component carrier group.

The carrier offset value of the specific component carrier may be determined by an index counting scheme classified according to a plurality of component carrier types.

In another aspect of the present invention, a method for transmitting a signal by a base station (BS) in a wireless communication system supporting multiple component carriers (CCs) includes scheduling a plurality of component carriers used by the user equipment; and transmitting identification information indicating a specific component carrier (CC) through one or more contiguous OFDM symbols located in the front of a subframe including a plurality of OFDM symbols, wherein the identification information indicating the specific component carrier includes a carrier offset value centering around a reference component carrier.

The method may further include transmitting index mapping information related to an index mapping rule of multiple component carriers depending on carrier scheduling, to the user equipment.

If the carrier scheduling of the UE is performed in units of a carrier group, a reinterpretation process is performed in which the identification information indicating the specific component carrier contained in a first component carrier (CC) group indicates a specific component carrier (CC) contained in a second component carrier group.

In another aspect of the present invention, a user equipment (UE) for use in a wireless communication system supporting multiple carriers includes a reception module for receiving a radio frequency (RF) signal; and a processor, through the reception module, for receiving identification information indicating a specific component carrier from one or more contiguous OFDM symbols located in the front of a subframe including a plurality of OFDM symbols received from a base station (BS), acquiring location information of the specific component carrier using index mapping information related to an index mapping rule of multiple component carriers used in the user equipment, and transmitting and receiving a signal through the specific component carrier, wherein the identification information indicating the specific component carrier includes a carrier offset value centering around a reference component carrier.

The identification information indicating the specific component carrier may include a carrier offset value centering around a reference component carrier.

The processor may determine whether the specific component carrier corresponds to uplink or downlink using the index mapping information and identification information of the specific component carrier.

In another aspect of the present invention, a base station (BS) for use in a wireless communication system supporting multiple carriers includes a transmission module for transmitting a radio frequency (RF) signal; and a processor for mapping indexes of multiple component carriers used in the user equipment (UE) according to carrier scheduling, and constructing identification information indicating a specific component carrier from among the multiple component carriers.

The processor may transmit, through the transmission module, the identification information and index mapping information of the multiple component carriers to the user equipment (UE) through one or more contiguous OFDM symbols located in the front of a subframe including the plurality of OFDM symbols, wherein the identification information indicating the specific component carrier includes a carrier offset value centering around a reference component carrier.

Those skilled in the art will appreciate that the exemplary embodiments of the present invention are merely part of preferred embodiments of the present invention and various embodiments of the present invention reflecting the technical features of the present invention can be derived and understood from the following detailed description of the present invention.

EFFECTS OF THE INVENTION

As is apparent from the above description, according to the embodiments of the present invention, identification information of a specific carrier can be effectively transmitted according to carrier scheduling in a wireless communication system.

In addition, the embodiments of the present invention can indicate specific information indicating whether the specific carrier belongs to uplink or downlink through identification information of the specific carrier.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
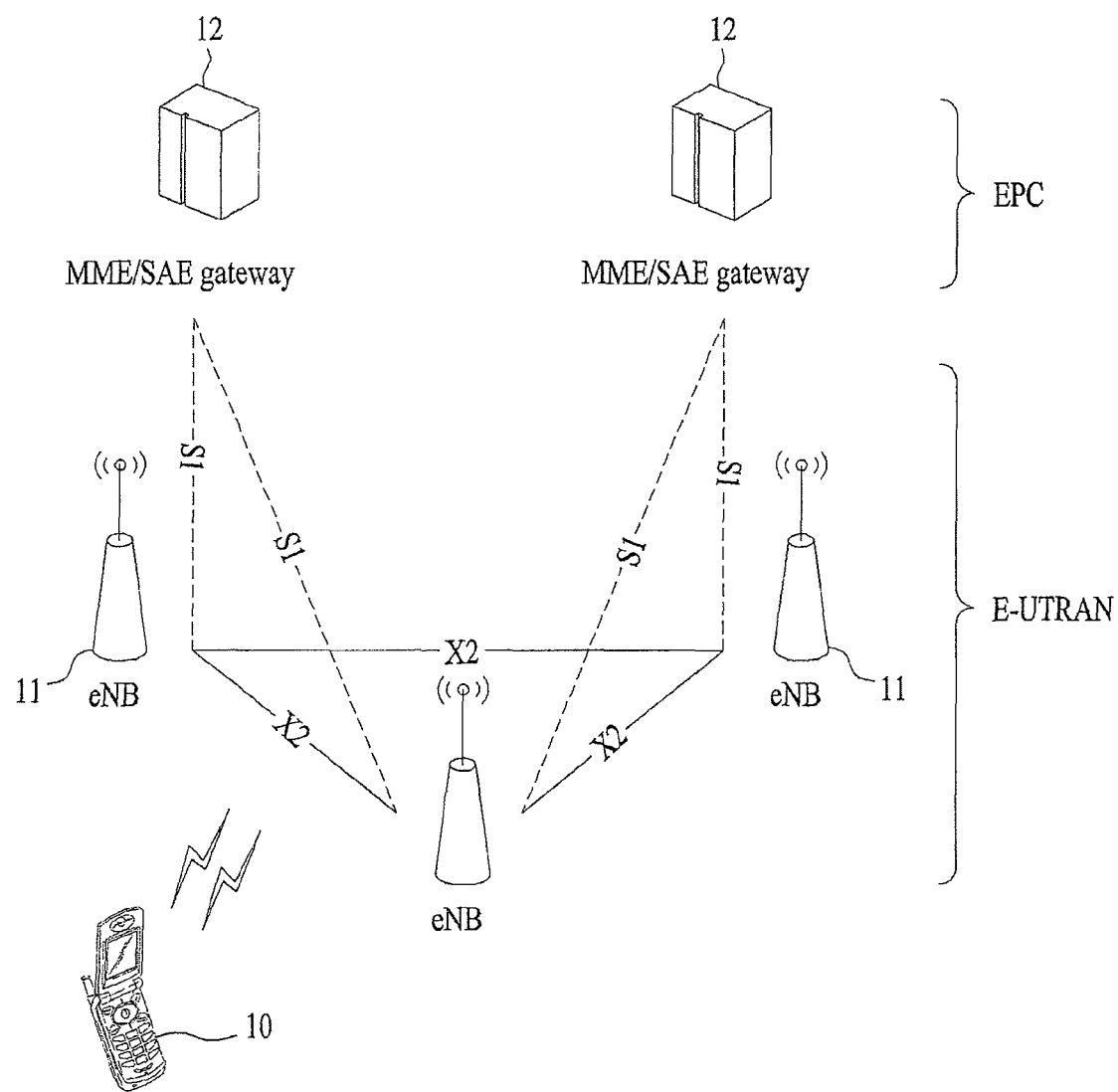
FIG. 1 is a conceptual diagram illustrating an Evolved Universal Mobile Telecommunications System (E-UMTS) network structure as an example of a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 2:
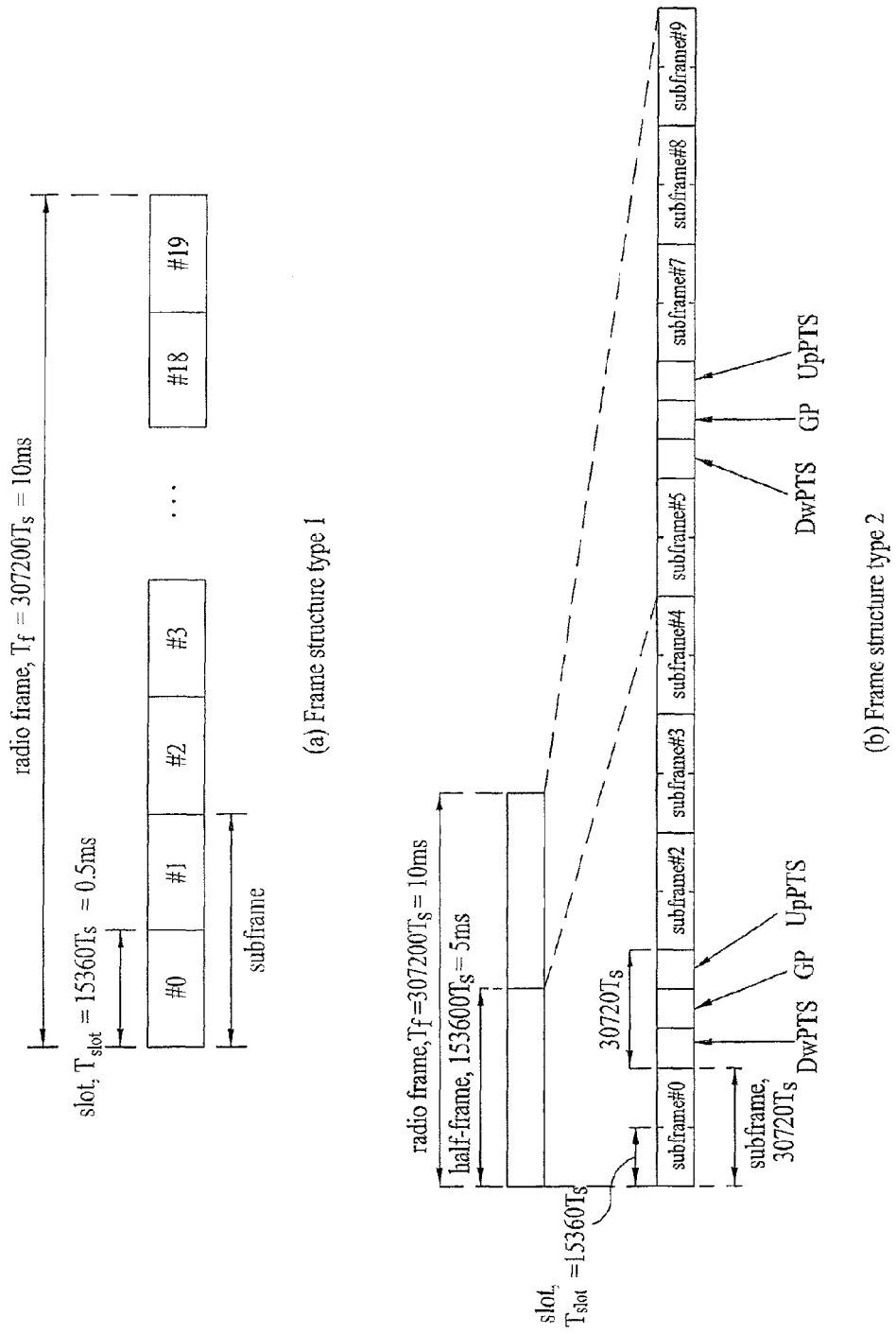
FIG. 2 is a diagram illustrating a structure of a radio frame used in a 3GPP LTE system.

FIG. 2 exemplarily shows a radio frame structure for use in a 3rd Generation Partnership Project Long Term Evolution (3GPP LTE) system.

Referring to FIG. 2, the radio frame has a length of 10 ms (327200·$T_s$) and includes 10 subframes of equal size. Each subframe has a length of 1 ms and includes two slots. In this case, $T_s$ represents sampling time, and is expressed by '$T_s$=1/(15 kHz×2048)=3.2552×10$^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers x seven (or six) OFDM (Orthogonal Frequency Division Multiplexing) symbols. A frame structure type 1 is used for FDD, and a frame structure type 2 is used for TDD. The frame structure type 2 includes two half frames, and each half frame includes 5 subframes, a downlink piloting time slot (DwPTS), a guard period (GP), and an uplink piloting time slot (UpPTS). The aforementioned structure of the radio frame is only exemplary, and various modifications can be made to the number of subframes contained in the radio frame or the number of slots contained in each subframe, or the number of OFDM (or SC-FDMA) symbols in each slot.

Figure 3:
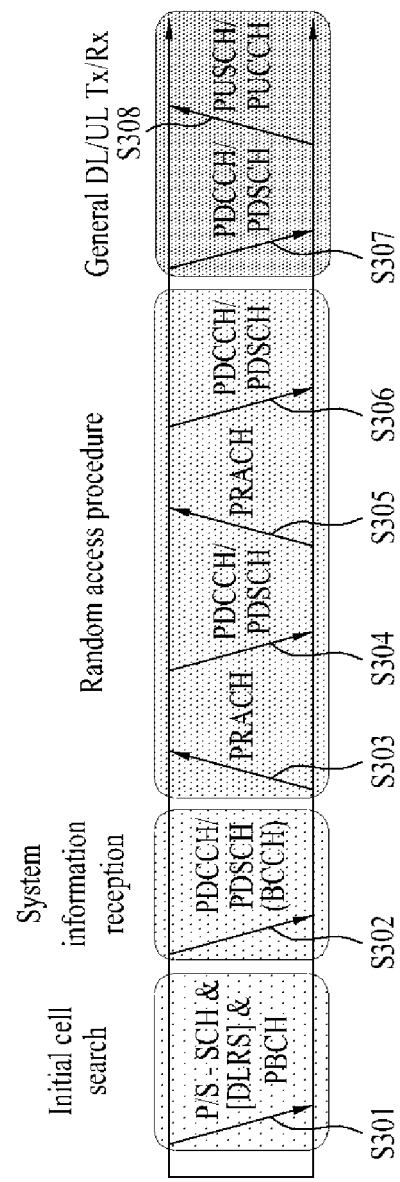
FIG. 3 is a conceptual diagram illustrating physical channels for use in a 3GPP LTE system and a method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the MS may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps S303 and S305 and receive a response message for the random access on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. On the other hand, uplink control information transmitted from the UE to the BS or downlink control information transmitted from the UE to the BS may include a downlink (DL) or uplink (UL) ACKnowledgement/Negative ACKnowledgement (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
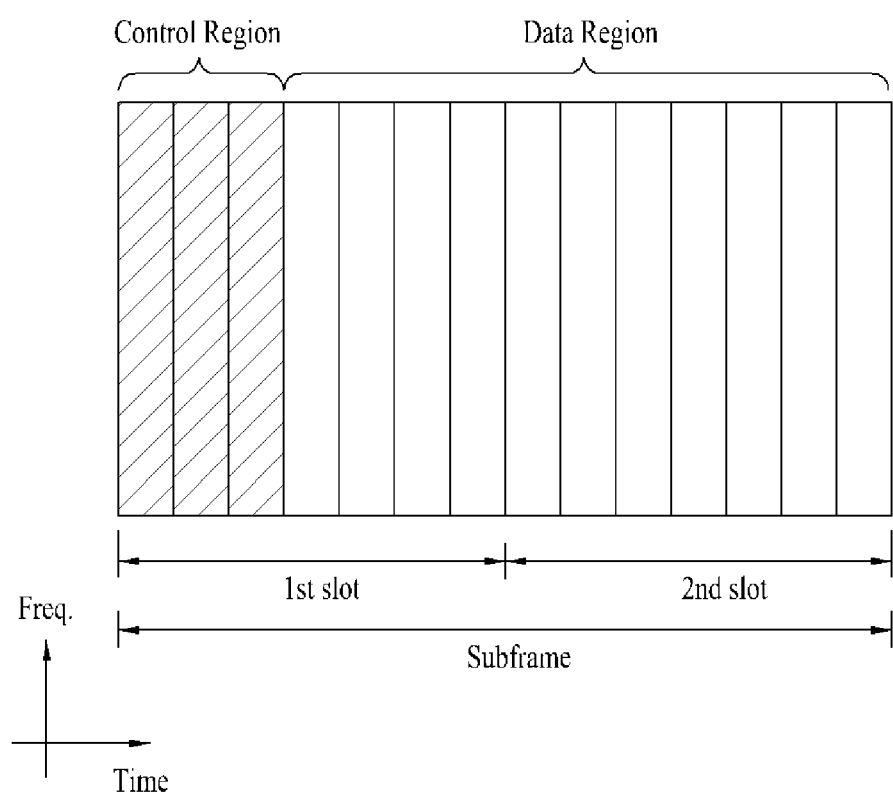
FIG. 4 illustrates a downlink (DL) subframe structure for use in a 3GPP LTE system.

FIG. 4 illustrates a downlink (DL) subframe structure for use in a 3GPP LTE system.

Referring to FIG. 4, one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channels for use in the 3GPP LTE system include a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement)/NACK (Not-Acknowledgement) signals about an UL Hybrid Automatic Repeat Request (UL HARQ). That is, the ACK/NACK signals about UL data transmitted from the UE are transmitted over PHICH.

PDCCH acting as a DL physical channel will hereinafter be described in detail.

A base station (BS) may transmit information about resource allocation and transmission format (UL grant) of the PDSCH, resource allocation information of the PUSCH, information about Voice over Internet Protocol (VoIP) activation, etc. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs.

Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PUSCH codeword |
| DCI format 1A | used for the compact scheduling of one PDSCH codeword and random access procedure initiated by a PDCCH order |
| DCI format 1B | used for the compact scheduling of one PDSCH codeword with precording inforamtion |
| DCI format 1C | used for very compact scheduling of one PDSCH codeword |
| DCI format 1D | used for the compact scheduling of one PDSCH codeword with precording and power offset information |

TABLE 1-continued

| DCI Format | Description |
| --- | --- |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

Figure 5:
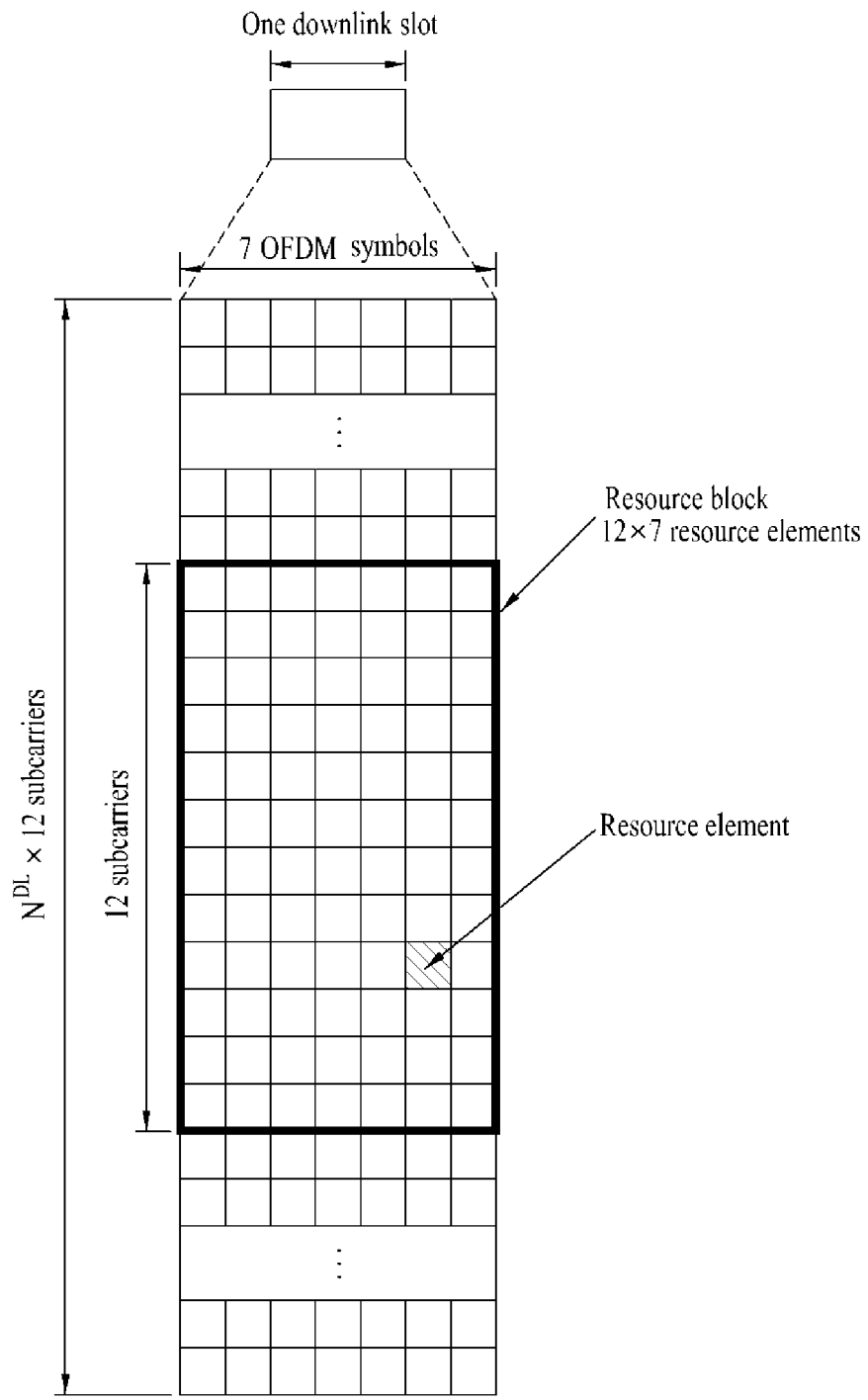
FIG. 5 shows a downlink (DL) time-frequency resource grid structure for use in a 3GPP LTE system.

FIG. 5 shows a downlink time-frequency resource grid structure for use in a 3GPP LTE system according to the present invention. In uplink and downlink, the same time-frequency resource grid structure is used as shown in FIG. 5.

Referring to FIG. 5, a signal transmitted in each slot can be described by a resource grid including $N_{RB}^{DL} \times N_{SC}^{RB}$ subcarriers and $N_{symb}^{DL}$ OFDM symbols. Here, $N_{RB}^{DL}$ represents the number of resource blocks (RBs), $N_{SC}^{RB}$ represents the number of subcarriers constituting one RB, and $N_{symb}^{DL}$ represents the number of OFDM symbols in one slot. $N_{RB}^{DL}$ varies with a bandwidth constructed in a cell, and must satisfy $N_{RB}^{min,DL} \leq N_{RB}^{DL} \leq N_{RB}^{Max,DL}$. Here, $N_{RB}^{min,DL}$ is the smallest bandwidth supported by the wireless communication system, and $N_{RB}^{max,DL}$ is the largest bandwidth supported by the wireless communication system. Although $N_{RB}^{min,DL}$ may be set to 6 ($N_{RB}^{min,DL}=6$) and $N_{RB}^{max,DL}$ may be set to 110 ($N_{RB}^{max}=110$), the scopes of $N_{RB}^{min,DL}$ and $N_{RB}^{max,DL}$ are not limited thereto. The number of OFDM or SC-FDMA symbols contained in one slot may be differently defined according to the length of a Cyclic Prefix (CP) and spacing between subcarriers. When transmitting data or information via multiple antennas, one resource grid may be defined for each antenna port.

Each element contained in the resource grid for each antenna port is called a resource element (RE), and can be identified by an index pair (k,l) contained in a slot, where k is an index in a frequency domain and is set to any one of 0, ..., $N_{RB}^{DL} N_{sc}^{RB}-1$, and l is an index in a time domain and is set to any one of 0, ..., $N_{symb}^{DL}-1$.

Resource blocks (RBs) shown in FIG. 5 are used to describe a mapping relationship between certain physical channels and resource elements (REs). The RBs can be classified into physical resource blocks (PRBs) and virtual resource blocks (VRBs).

One PRB is defined by $N_{symb}^{DL}$ consecutive OFDM symbols in a time domain and $N_{SC}^{RB}$ consecutive subcarriers in a frequency domain. $N_{symb}^{DL}$ and $N_{SC}^{RB}$ may be predetermined values, respectively. For example, $N_{symb}^{DL}$ and $N_{SC}^{RB}$ may be given as shown in the following Table 1. Therefore, one PRB may be composed of $N_{symb}^{DL} \times N_{SC}^{RB}$ resource elements. One PRB may correspond to one slot in a time domain and may also correspond to 180 kHz in a frequency domain, but it should be noted that the scope of the present invention is not limited thereto.

TABLE 2

| Configuration | | $N_{sc}^{RB}$ | $N_{symb}^{DL}$ |
| --- | --- | --- | --- |
| Normal cyclic prefix | Δf = 15 kHz | 12 | 7 |
| Extended cyclic prefix | Δf = 15 kHz | | 6 |
| | Δf = 7.5 kHz | 24 | 3 |

The PRBs are assigned numbers from 0 to $N_{RB}^{DL}-1$ in the frequency domain. A PRB number $n_{PRB}$ and a resource element index (k,l) in a slot can satisfy a predetermined relationship denoted by $$n_{PRB} = \left\lfloor \frac{k}{N_{sc}^{RB}} \right\rfloor.$$

The VRB may have the same size as that of the PRB. The VRB may be classified into a localized VRB (LVRB) and a distributed VRB (DVRB). For each VRB type, a pair of PRBs allocated over two slots of one subframe is assigned a single VRB number $n_{VRB}$.

The VRB may have the same size as that of the PRB. Two types of VRBs are defined, the first one being a localized VRB (LVRB) and the second one being a distributed type (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$ and $N_{RB}^{DL}$ VRBs belonging to a second one of the two slots are likewise each assigned any one index of 0 to $N_{RB}^{DL}-1$.

Figure 6:
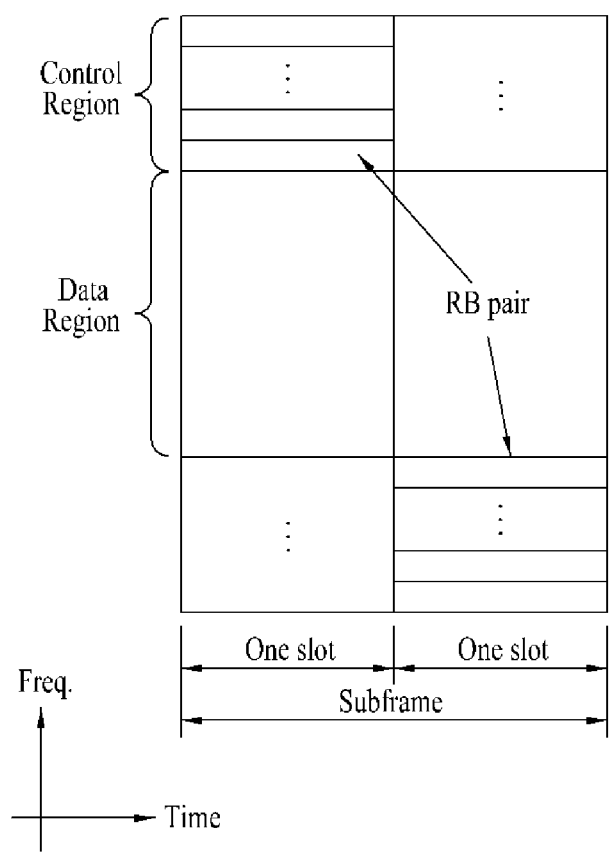
FIG. 6 illustrates an uplink (UL) subframe structure for use in a 3GPP LTE system.

FIG. 6 illustrates an uplink (UL) subframe structure for use in a 3GPP LTE system.

Referring to FIG. 6, the uplink (UL) subframe includes a plurality of slots (e.g., 2 slots). The UL subframe is divided into a data region and a control region in a frequency domain. The data region includes PUSCH and transmits a data signal such as voice, image and the like. The control region includes PUCCH, and transmits Uplink Control Information (UCI). PUCCH includes a pair of RBs (hereinafter referred to as an RB pair) located at both ends of the data region on a frequency axis, and is hopped using a slot as a boundary. Control information may include Hybrid Automatic Retransmit reQuest (HARQ) ACK/NACK, channel information for downlink (hereinafter referred to as 'downlink channel information' or 'channel information'). The downlink channel information may include a CQI, a PMI, an RI, etc. Upon receiving the downlink channel information from each UE, the BS can determine proper time/frequency resources, a modulation method, a coding rate, etc. required for transmitting data to each UE.

Channel information for use in the LTE system may include CQI, PMI, RI, etc. If necessary, some or all of CQI, PMI, and RI may be transmitted in response to a transmission mode of each UE. In an exemplary case in which channel information is periodically transmitted, this exemplary case is referred to as periodic reporting. In another exemplary case in which channel information is transmitted by a request of the BS, this exemplary case is referred to as aperiodic reporting. In case of the aperiodic reporting, a request bit contained in uplink scheduling information received form the BS is transmitted to a UE. Thereafter, the UE transmits channel information considering its own transmission mode to the BS over a PUSCH. In the case of the periodic reporting, a period, an offset for use in the corresponding period, etc. are semi-statically signaled in units of a subframe through a higher layer signal for each UE. Each UE transmits channel information considering the transmission mode to the BS through a PUCCH according to a predetermined period. If uplink data is also present in the subframe carrying channel information, the channel information as well as data is transmitted over an uplink data channel (PUSCH). The BS transmits transmission timing information appropriate for each UE to the UE in consideration of a channel condition of each UE, a UE distribution of each cell, etc. The transmission timing information may include a period, an offset, etc. required for transmitting channel information, and may be transmitted to each UE through a radio resource control (RRC) message.

In a conventional LTE system, a single carrier is configured in uplink or downlink transmission, and a PUCCH of a certain UE is configured and transmitted within the single carrier. Since the uplink transmission is performed by the UE, PAPR (Peak-to-Average Power Ratio) should be low in order to reduce battery consumption. Therefore, a modulation scheme with a single carrier property is used.

However, in an IMT-Advanced system such as an LTE-advanced (LTE-A) system, as a UE transmits a larger amount of control information to a base station, large payload symbols need to be simultaneously transmitted via a legacy control channel. Therefore, when the control information transmitted via a control channel or a shared channel in uplink is transmitted in a state of being joint coded, overhead can be reduced and a channel coding gain can be increased. The joint coded control information may be transmitted or received using a multiple-carrier-based transmission scheme or a transmission scheme based on a combination of a single carrier and multiple carriers, in order to perform broadband communication. The UE may be selectively operated in each carrier, or transmit or receive signals simultaneously using several carriers.

If a UE of the LTE-A system uses multiple carriers, two methods may be used to transmit scheduling information of a specific carrier, i.e., a first method for including scheduling control information in the corresponding carrier and transmitting the resultant information, and a second method for transmitting control information of the corresponding carrier through another carrier.

The method for transmitting carrier scheduling control information through the corresponding carrier indicates that control information relates to the corresponding carrier so that a target indicated by a carrier is specified. In contrast, in the case of using a carrier specified through control information included in another carrier, the corresponding control information requires indication information indicating which carrier is specified.

As described above, a field including identification information that is transmitted to distinguish a specific carrier from another carrier according to a carrier scheduling may be defined as a carrier indication field (CIF). A predetermined number of bits may be assigned to the CIF (e.g., 3 bits), and an index of a carrier to be specified may be indicated.

In the case in which the BS transmits control information such as carrier identification information based on carrier scheduling to each UE, the CIF may include identification information (e.g., index information of the corresponding carrier) of a specific carrier to be allocated from among all carriers.

In addition, the present invention proposes a method for determining an offset value of a carrier index to be carrier identification information to be transmitted through the CIF, a method for determining whether the corresponding carrier corresponds to downlink or uplink on the basis of the carrier identification information, a method for interpreting carrier identification information transmitted through the CIF, etc.

1. First Embodiment (wherein carrier offset value is transmitted through CIF)

According to one embodiment of the present invention, the BS may represent index information of a carrier designated for a specific UE as an offset value according to carrier scheduling. If the CIF is interpreted as an offset value, the offset value for specifying the carrier may be set to indication information indicating a specific carrier on the basis of a reference carrier. That is, either the spacing from the location of a certain carrier to an objective carrier location or an index difference may be denoted by an offset value.

Figure 7:
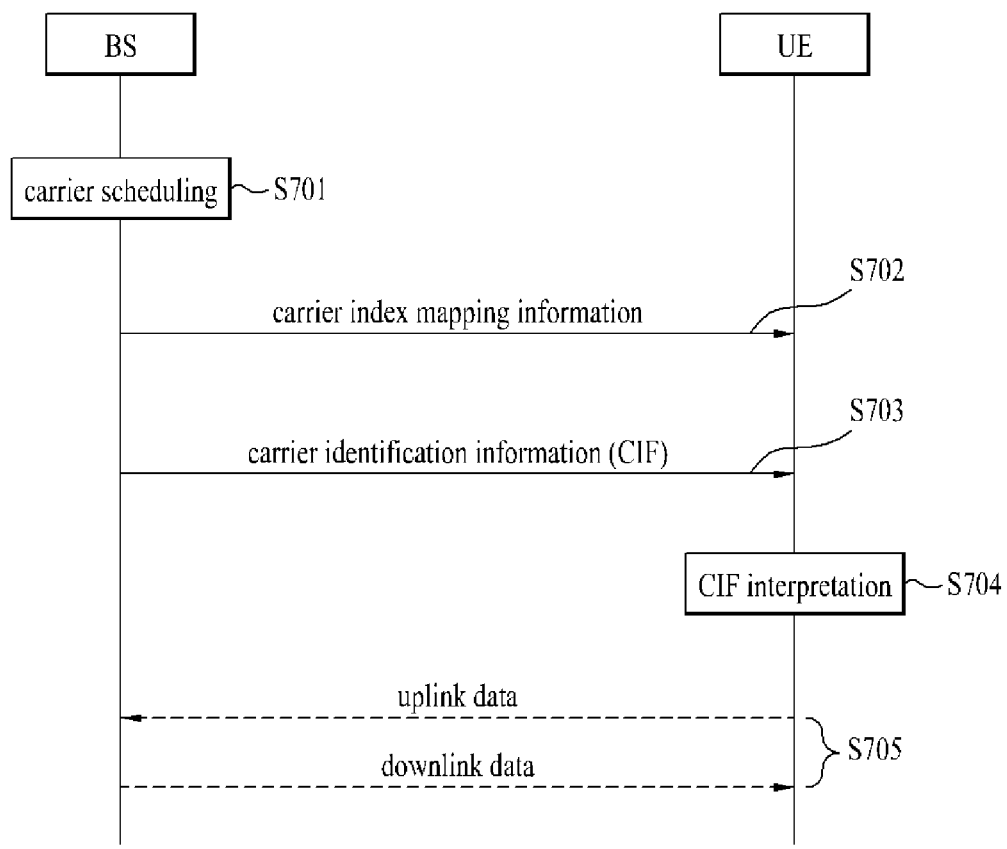
FIG. 7 is a flowchart illustrating a method for enabling a base station (BS) to transmit carrier identification information regarding carrier aggregation scheduling to a user equipment (UE) according to one embodiment of the present invention.

FIG. 7 is a flowchart illustrating a method for enabling a BS BS to transmit carrier identification information regarding carrier aggregation scheduling to a UE according to one embodiment of the present invention.

Referring to FIG. 7, the BS may perform carrier scheduling for allocating downlink and/or uplink carriers within a predetermined range of the corresponding UE in step S701.

During the scheduling process, the BS may determine a carrier used as a reference of the offset value such that it can represent identification information of the carrier allocated through the CIF as an offset value. For convenience of description and better understanding of the present invention, a reference carrier of the offset value will hereinafter be referred to as 'reference carrier'. A variety of methods for determining the reference carrier may be used. For example, various carriers may be configured according to carrier types, or the reference carrier may be cell-specifically or UE-specifically determined. The term "offset" indicates identification information for indicating a specific carrier to be assigned to the corresponding UE by the BS. That is, a difference between indexes may be denoted on the basis of the index of the reference carrier. The offset value may be set to an absolute value indicating a difference between index values, or may also be set to a relative value for specifying an indication carrier from among the reference carrier.

In addition, an offset value for a carrier to be specified on the basis of the determined reference carrier is determined, such that the CIF is configured. Application of the offset value may be acquired from various methods.

In addition, in order to recognize the location of the allocated carrier using an offset value by the UE having received the CIF during the offset value application, the BS may implement a carrier index count in various ways according to the carrier types.

A method for constructing an offset value of the CIF during the carrier scheduling process will hereinafter be described in detail.

During the BS scheduling process, the may transmit configuration information of a carrier or carrier aggregation allocated to the UE, and may transmit not only identification information of a reference carrier but also index mapping information of multiple carriers allocated to the UE in step S702. in this case, index mapping information of a reference carrier and index mapping information of multiple carriers may be transmitted through separate uplink signaling. Carrier index mapping information may be statically or semi-statically established in step S702. Thereafter, the BS transmits the CIF, that includes indication information of a specific carrier acting as an indication target from among multiple carriers to be used for the corresponding UE, to the UE through another downlink carrier in step S703. In this case, carrier identification information contained in the CIF may be denoted by an offset value between carrier indexes.

The UE interprets carrier identification information contained in the received CIF on the basis of the received carrier index mapping information, such that it can derive the frequency location information of a specific carrier allocated to the corresponding UE in step S704. In this case, when the UE derives the location of a carrier using a CIF-based offset value, it may construct a variety of counting operations according to carrier types. For example, the UE may determine whether the carrier type is at least one of a scheduling CC, a non-backward compatible CC, and an extended CC, such that different counting methods may be used to search for a specific CC (to be designated by the BS) through the received CIF according to the determined result.

Thereafter, the UE may receive or transmit data through the designated downlink carrier and/or uplink carrier in step S705.

Thereafter, in order to enable the BS to transmit the location information of the carrier allocated to the corresponding UE in the carrier scheduling step S701, constituent steps of the CIF will hereinafter be described.

(1) Reference Carrier Decision

According to one embodiment of the present invention, the BS may represent an offset value of a specific carrier by arbitrarily establishing a reference carrier. The reference carrier may be statically determined for all UEs by the BS, or may be arbitrarily or time-variably determined for each UE.

A. Case for Determining Reference Carrier in Consideration of Type of Carrier to which is Transmitted The BS may determine a carrier to which CIF is transmitted as a reference carrier.

For bandwidth extension to satisfy performance requested by the LTE-A system, a unit carrier capable of being used by the UE is defined as a component carrier (CC). In the LTE-A system, a maximum of 5 CCs may be combined, and the combined result may be extended to a maximum bandwidth of 100 MHz. Hereinafter, the terms "carrier" and "CC" ,may be used interchangeably.

The carriers may be classified into a backward compatible carrier, a non-backward compatible carrier, and an extension carrier according to carrier characteristics. In accordance with one embodiment of the present invention, the BS considers which one of a backward compatible carrier, a non-backward compatible carrier, and an extension carrier is used as a CIF transmission carrier, such that it can determine the reference carrier according to the determined result.

The backward compatible carrier supports the legacy system, and may be defined as a carrier capable of being accessed by all LTE UEs. The backward compatible carrier may be operated as a single carrier or a part of carrier aggregation. One pair of backward compatible carriers (e.g., a pair of uplink and downlink carriers) is always used in the FDD system. If the carrier for CIF transmission is used as a backward compatible carrier, a carrier used for CIF transmission may be determined to be a reference carrier.

The non-backward compatible carrier is not accessed by a UE belonging to the legacy system. That is, it is impossible for the non-backward compatible carrier to be interchangeably used in the legacy system and the current system. The non-backward compatible carrier may operate as a single carrier on the condition that non-compatible characteristics between the legacy system and the current system are based on a duplex distance. Otherwise, the non-backward compatible carrier may be operated as a part of the carrier aggregation. If the CIF transmission carrier is used as a non-backward compatible carrier, the corresponding carrier may be set to a reference carrier or another backward compatible carrier may also be set to a reference carrier.

The extension carrier may not operate as a single carrier, and may be used only for bandwidth extension.

In more detail, provided that the corresponding carrier can independently perform basic access, cell search, and system information transmission for a UE of an arbitrary cell, BS, or RN by defining a physical channel and a physical signal as in those of the LTE Rel-8 carrier, the above-mentioned carrier is defined as a stand-along carrier, and the stand-alone carrier includes the backward compatible carrier and the non-backward compatible carrier. Differently from the stand-along carrier, a carrier including non-stand-alone characteristic not supporting the above-mentioned processes may be defined as an extension carrier.

If the carrier for CIF transmission is the extension carrier, it is impossible for the CIF transmission carrier to be used as a reference carrier. In this case, the BS may determine another backward compatible carrier or another non-backward compatible carrier to be a reference carrier.

B. Case in which Reference Carrier is Cell-specifically Determined

In accordance with one embodiment of the present invention, the BS may cell-specifically determine a reference carrier. If the cell-specific reference carrier is determined, all UEs located in the corresponding cell may obtain an offset value for a scheduled carrier for each UE on the basis of the same reference carrier.

C. Case in which Reference Carrier is UE-specifically Determined

The reference carrier may be UE-specifically determined. In this case, an independent reference carrier distinctive for each UE may be determined, or the same reference carrier may be determined for a non-continuous UE in consideration of the location of an inter-cell UE.

In this way, when determining the cell-specific reference carrier or UE-specific reference carrier, the reference carrier may be determined in consideration of an anchor carrier and a primary anchor carrier.

The method for transmitting an offset value of a specific carrier through the CIF can be applied not only to a downlink carrier but also to an uplink carrier.

In uplink, a specific uplink carrier is determined to be a reference carrier such that it can indicate an offset value of an uplink carrier to be specific to the corresponding UE, and information of an uplink carrier related to the corresponding downlink carrier can be derived on the basis of the location information of a frequency of a specific downlink carrier.

For example, identification information of a DL CC transmitted through a DCI is detected according to the legacy scheme, or identification information of a DL CC transmitted through a CIF is detected according to one embodiment of the present invention, such that a UL CC related to the corresponding DL CC is detected. That is, identification information of a DL CC transmitted through a DCI or CIF is interpreted as identification information of a UL CC, and additional identification information for a UL CC may not be transmitted. Alternatively, UL CC information related to the corresponding DL CC can be obtained using information of a specific DL CC that is transmitted to the UE through additional signaling.

However, the BS must transmit information of a UL CC related to a specific DL CC to the UE, and the UL CC information is classified into UE-specific information, UE-group-specific information, carrier-specific information, system-specific information in such a manner that the resultant information can be transmitted.

(2) Decision of Offset Value

In accordance with one embodiment of the present invention, the BS may transmit information regarding a downlink or uplink carrier to be assigned to the corresponding UE in response to carrier scheduling through the CIF using the downlink or uplink carrier information as an offset value.

For example, in accordance with a method for determining an offset value of the carrier, a reference carrier is set to a constant value (e.g., zero '0'), and an offset value is added to the reference carrier, such that index information of a specific carrier can be obtained. In this case, the offset value may be denoted by at least one of a positive(+) value and a negative(−) value.

Decision of the offset value may be denoted by at least one of a positive(+) value and a negative(−) value in consideration of the location of a reference carrier and the location of a carrier to be designated.

If necessary, the offset value of the determined carrier may exceed the range of a UE-specific configured CC set or the range of a system-specific configured CC set. In this case, the BS may perform round-robin carrier indexing at a UE-specific configured CC set such that the UE can properly interpret offset information related to a carrier index received through the CIF. Alternatively, the BS may perform round-robin carrier indexing at a system-specific configured CC set.

In this case, the round-robin scheme is conceptually identical to the cyclic ordering scheme. If the indexing operation is performed according to the round-robin scheme, indexes can be sequentially mapped to all CCs contained in a CC group according to a specific order.

(3) Carrier Index Decision considering Carrier Type

In accordance with one embodiment of the present invention, the BS may construct a CIF such that the carrier index counting operation can be differently applied according to carrier types. In this case, the carrier index counting operation is adapted to search for the designated carrier using the offset value acting as carrier identification information transmitted through the CIF. That is, if the above-mentioned counting need not be performed according to the carrier type, a smaller number of bits than the number of bits allocated to the CIF can be allocated to the indexing operation as compared to the carrier counting process. The BS may consider various carrier types during the scheduling process, for example, the backward compatible carrier, the non-backward compatible carrier, the extension CC, etc. Hereinafter, a method for indexing specific carriers on a CIF according to a carrier type during the carrier scheduling operation of the BS will hereinafter be described in detail. The following indexing process may be performed in the scheduling process of the step S701 shown in FIG. 7.

A. Backward Compatible CC

Provided that the BS uses only the backward compatible CC during the cross scheduling of the carrier scheduling process, the BS can perform indexing of carriers in such a manner that all backward compatible CCs can be sequentially counted during the offset calculation. In the case of the cross scheduling, there may be the relationship between a scheduling CC capable of being used to transmit scheduling information and a scheduled CC scheduled according to the scheduling operation. Therefore, according to one embodiment of the present invention, a backward compatible CC transmitted through a CIF is set to a scheduled CC, and a CC used for CIF transmission may be considered to be a scheduling CC. The backward compatible CC may correspond to the scheduling CC or the scheduled CC. The backward compatible CC scheduled to the corresponding UE according to the BS scheduling operation may be referred to as a scheduled CC. Hereinafter, the term 'backward compatible CC' may also correspond to the scheduled CC.

B. Backward Compatible CC (scheduled CC) and Extension CC

In the carrier scheduling process, the BS may include all the backward compatible CCs or may group one backward compatible CC and its neighbor extension CCs into one group and then perform indexing of the grouped result. For example, if the BS performs cross-carrier scheduling, cross-carrier scheduling is not performed in another backward compatible CC, and downlink cross-carrier scheduling may be performed only in the extended CC. In this case, the scheduling operation may be performed only for the extension CC located in the vicinity of the backward compatible CC used for CIF transmission from among the extension CCs, or the scheduling operation may also be performed on an extension CC located in the vicinity of another backward compatible CC. In addition, the backward compatible CC not contained in a PDCCH monitoring set from among backward compatible CCs is set to the extension CC so as to determine an offset value, and the counting operation is then performed.

C. Backward Compatible CC (Scheduled CC) and Non-backward Compatible CC

If it is impossible for the BS to schedule the non-backward compatible CC, the offset indexing may be performed using the corresponding CC as an extension CC. Alternatively, even when the non-backward compatible CC can be scheduled, indexing of multiple CCs to be assigned to the corresponding UE can be performed using the non-backward compatible CC as the extension CC according to the scheme for establishing the actual PDCCH monitoring set. That is, if PDCCH monitoring is not performed in a specific CC, a PDCCH for the corresponding CCs must be received over a control channel transmitted other carriers.

The BS can perform the scheduling process in such a manner that the offset counting can be performed only considering the backward compatible CC or non-backward compatible CC in the carrier scheduling process, and the BS may distinguish objective CCs capable of receiving the PDCCH from other CCs incapable of receiving the PDCH, and perform indexing of the distinguished CCs. That is, even in the case of scheduling the backward compatible CC and the extension CC, the BS may discriminate between a CC capable of receiving a PDCCH and a CC capable of receiving a PDCCH. In this case, during the carrier scheduling process, the BS performs counting of CCs, that are located in the vicinity of a PDCCH reception CC and are incapable of receiving a PDCCH, and performs indexing of the counted CCs. Alternatively, the BS counts only CCs incapable of receiving the PDCCH and then schedules the counted result.

D. Non-backward Compatible CC and Extension CC

The non-backward compatible CC has a control channel structure for enabling the BS to transmit control information caused by the carrier scheduling operation, such that the cross-carrier scheduling operation can also be performed on other carriers related to specific non-backward compatible CCs.

Therefore, it is assumed that all the non-backward compatible CCs can transmit scheduling information on the condition that the BS schedules the non-backward compatible CC and the extension CC, an offset of the extension CC can be determined on the basis of the non-backward compatible CC used to transmit scheduling information. In this case, a non-backward compatible CC not used to transmit scheduling information from among the non-backward compatible CCs may be considered to be the extended CC, such that a necessary offset can be determined.

E. Backward compatible CC (Scheduling CC), Non-backward Compatible CC, and Extension CC If the BS performs carrier scheduling of the backward compatible CC, the non-backward compatible CC and the extension CC, a CC capable of transmitting scheduling information and a CC incapable of transmitting scheduling information may be distinguished from each other such that these CCs can be differently defined and used. That is, in the same manner as in the above-mentioned example, an offset value may be determined on the basis of a CC (for example, a backward compatible CC and a non-backward compatible CC that are used to transmit scheduling information) used to transmit scheduling information.

F. CIF Configuration for UL CC

Differently from the downlink case, in the case of the uplink, the corresponding carrier may be specified through transmission of an indicator of a UL CC set that is capable of being used by the UE through the CIF, irrespective of transmission or non-transmission of the scheduling information related to a CC to be scheduled.

In the case of a UL CC, all UL CCs capable of being allocated to the corresponding UE are sequentially counted and indexed. In this case, provided that the number of UL CCs exceeds a predetermined number and the UL CCs exceed the range of an offset capable of being transmitted through the CIF field, the scheduling operation may be performed on the basis of a UL CC composed of a backward compatible CC or may also be performed on the basis of a UL CC composed of a non-backward compatible CC adjacent to the backward compatible CC, similarly to those of the downlink scheduling process. In this case, if a total number of UL CCs of the corresponding UE is set to a predetermined number or higher (e.g., 3 or higher), the offset indexing may be performed on the remaining UL CCs other than some UL CCs, the number of which exceeds a total number of UL CCs, such that the offset indexing can be performed in the CIF range. The UL CC excluded from the offset indexing is indexed in a manner that the cross carrier scheduling is performed at another DL CC capable of being scheduled, and the corresponding information can be transmitted through the UL CC. That is, a UL CC related to a specified DL CC can be derived using carrier indexing information of a DL CC, such that UL CC information can be indicated.

As described above, if the CIF is interpreted as an offset value according to embodiments of the present invention, from the viewpoint of a UE, the range of a CIF received through a specific DL CC may overlap the range of a CIF received through another DL CC. In order to prevent the above-mentioned problem from being generated, the range of a CIF transmitted through any one DL CC may not overlap the range of a CIF transmitted through another DL CC. In this case, if the number of DL CCs via which scheduling information is transmitted is 2 or higher, the indexing of different CC sets can be performed through the offset value on the basis of the same reference carrier. In addition, the embodiment may not construct the cross carrier scheduling set without considering whether information transmitted through the CIF is either index information of a carrier to be actually designated or an offset value of the embodiment. For example, one case in which some parts of the UE configured CC set may independently use non-cross carrier scheduling, or another case in which modified communication such as machine-type communication is used are unable to construct the cross-carrier scheduled set. In this case, during the offset calculation, some CCs may be excluded from among the cross-carrier scheduled CC set, and indexing of the remaining CCs may be defined.

2. Second Embodiment (distinction between DL CC/UL CC distinction through CIF)

In the case of configuring the CIF according to one embodiment of the present invention, the CIF may be configured only in DL CCs or in UL CCs, or DL CC and UL CC may be combined to configure the CIF, such that DL CC and UL CC can be distinguished from each other in a method for interpreting the CIF.

For example, in order to recognize which link is associated with carrier control information acting as control information received through decoding of one PDCCH, it is determined whether the corresponding control information is discriminated either at the cross-carrier viewpoint or at the DL/UL viewpoint. If DL CC and UL CC are combined in the interpretation process, interpretation of the above-mentioned two viewpoints can be solved.

A method for transmitting control information capable of discriminating between DL CC and UL CC through the CIF according to one embodiment of the present invention will hereinafter be described with reference to FIG. 8.

Figure 8:
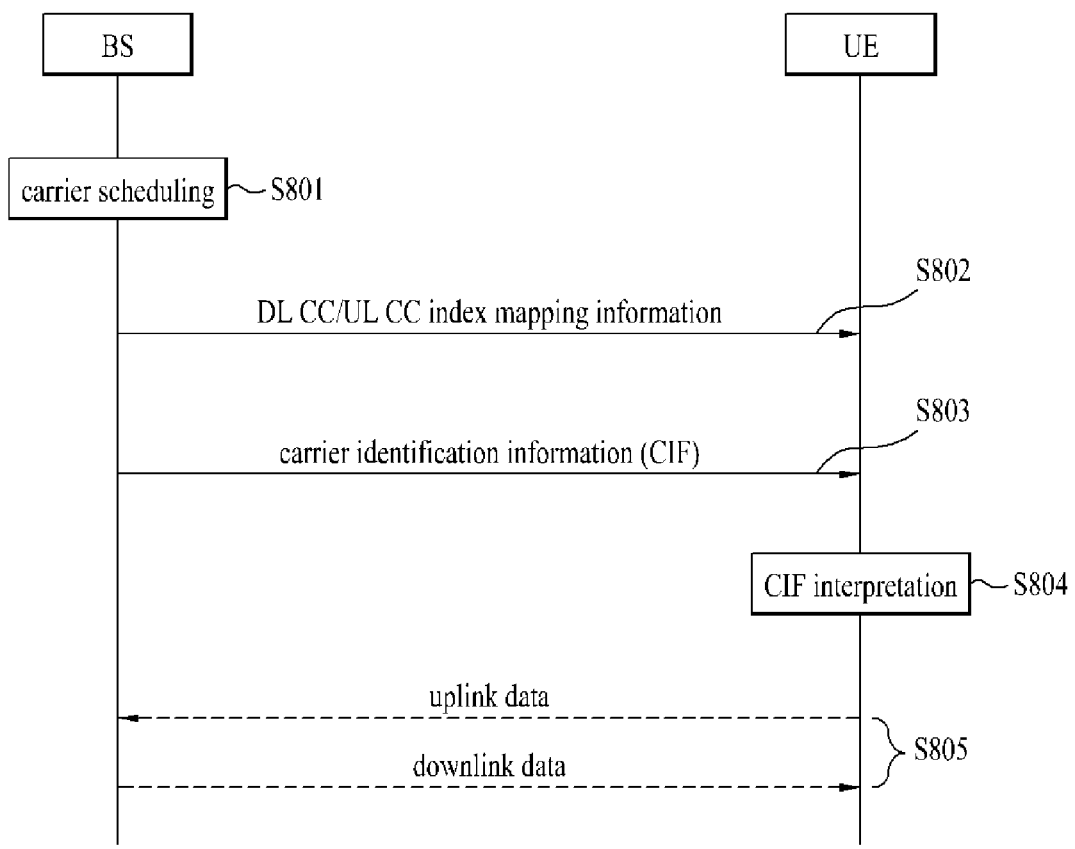
FIG. 8 is a flowchart illustrating a method for enabling base station (BS) to transmit carrier identification information regarding carrier scheduling to a user equipment (UE) according to one embodiment of the present invention.

FIG. 8 is a flowchart illustrating a method for enabling a base station (BS) to transmit carrier identification information regarding carrier scheduling to a user equipment (UE) according to one embodiment of the present invention.

Referring to FIG. 8, the BS according to one embodiment of the present invention schedules a carrier to be used by the corresponding UE under the situation of carrier aggregation in step S801.

In this case, carrier scheduling or carrier aggregation scheduling is performed, DL CC and/or UL CC indexes are determined according to a predetermined mapping rule, and a CIF indicating an index of a specific CC to be specified for the corresponding UE can be constructed.

The carrier mapped to the CIF may include UL CC and/or DL CC. Individual values indicated by the CIF may be differently established according to individual CCs.

The predetermined mapping rule may be arbitrarily determined by the BS, or may be predetermined by the BS. For example, a DL CC is mapped to a low index, a UL CC is mapped to a high index in such a manner that the DL CC and the UL CC can be sequentially mapped. If necessary, UL CC may be mapped to a low index, and DL CC may be mapped to a high index. In another method, DL and UL CCs are sequentially indexed without discriminating between DL and UL, such that a CIF value is constructed and mapped. In this case, DL and UL are associated with a specific carrier derived as an offset value indicated through a CIF, such that the specific carrier can be calculated using one offset calculation method.

For example, provided that a CIF is composed of 3 bits, a maximum of 8 carriers may be specified. Under the condition that a total of 8 CCs composed of 5 DL CCs and 3 UL CCs are used by the corresponding UE, provided that a low index is allocated to the DL CC and a high index is allocated to the UL CC according to the predetermined mapping rule, the 8 CCs can be indexed in the order of {DL CC1, DL CC2, DL CC3, DL CC4, DL CC5, UL CC6, UL CC7, UL CC8}.

In order to discriminate between DL CC and UL CC through the CIF, the DL CC and the UL CC must be independently distinguished from each other.

The index mapping information in which DL CC and UL CC are sequentially indexed according to DL and UL distinction can be transmitted to the UE along with carrier or carrier aggregation configuration information in step S802. Alternatively, the index mapping information may be transmitted through additional higher layer signaling before or after transmitting the carrier aggregation configuration information.

Thereafter, the BS transmits identification information and CIF of a specific CC acting as a current indication object from among multiple DL CCs and UL CCs to be used in the corresponding UE to the UE in step S803.

In step S801, the BS may construct a CIF in association with 8 CCs indexed in the order of {DL CC1, DL CC2, DL CC3, DL CC4, DL CC5, UL CC6, UL CC7, UL CC8}. The BS may indicate whether a carrier to be specified relates to uplink or downlink through the CIF value.

In addition, identification information of the carrier indicated by the CIF value may be denoted by an offset value calculated on the basis of the index of a reference carrier. For example, provided that CC (DL CC4) including a CIF is determined to be a reference carrier and aims to indicate UL CC7, an offset value through the CIF may be set to a value of (+)3. Alternatively, when specifying DL CC1 under the same situation, an offset value through the CIF may be denoted by a value of (−)3. In this case, the sign of an offset value can be represented through a specific bit (e.g., a first bit) from among the number of bits allocated to the CIF. For example, if a positive(+) offset value is used, a first bit may be denoted by '1'. If a negative(−) offset value is used, a first bit may be denoted by '0'.

The UE having received the above-mentioned information can interpret a CC capable of being used by the UE (i.e., UE-available CC) through the CIF received on the basis of the pre-transmitted CC index mapping information in step S804.

For example, if a CIF value received by the UE along with the grant message indicates any one of 1 to 5, it can be recognized that the CIF value indicates identification information of a DL CC. If a CIF value indicates any one of 6 to 8, it can be recognized that the CIF value indicates identification information of a UL CC. Therefore, a reference point may be denoted by '0', and an offset value can be recognized on the basis of the reference point.

In another example, it can be recognized whether a CC specified by the corresponding offset is a UL CC or a DL CC on the basis of the reference point CC. As previously stated in step S803, assuming that the BS determines a carrier related to CIF transmission to be a reference carrier and a CC including the CIF is denoted by DL CC4, if the offset value based on the CIF is set to (+)3, this means UL CC7, such that the corresponding grant may correspond to uplink. Alternatively, if the offset value based on the CIF is set to (−)3, this means DL CC1, and the corresponding grant may correspond to downlink.

Thereafter, the UE may interpret the received CIF, such that it may receive downlink data or transmit uplink data through a CC designated on the basis of information of DL CC and/or UL CC to be used in step S805.

Information of distinction between DL CC and UL CC and information of the specified CC can be recognized through the CIF value according to an embodiment of the present invention, such that an additional field for indicating whether the corresponding DCI format is a downlink DCI or an uplink DCI may not be contained in the CIF.

In FIG. 8, in order to discriminate between DL CC and UL CC on the CIF, the DL CC and the UL CC must be mapped not to be jointed. The above-mentioned first embodiment may employ a method for determining a reference carrier, a method for determining an offset value, a method for determining an offset value according to the carrier type, etc.

3. Third Embodiment (reused as carrier information of multiple CC groups through CIF value)

In the case of the CIF according to the above-mentioned embodiment, the number of specified carriers may be limited according to the number of bits allocated irrespective of performance of each UE. For example, if 3 bits are assigned to the CIF, the BS may transmit identification information of 8 carriers to the UE.

Therefore, according to another embodiment of the present invention, the number of bits of the CIF for use in uplink or downlink can be flexibly defined according to UE performance. If the number of bits allocated to the CIF is increased, the number of CCs capable of being allocated from the BS to the UE is also increased. In this case, multiple CCs capable of being used by the corresponding UE are classified into several groups, such that the CIF value can be constructed in units of a group.

Figure 9:
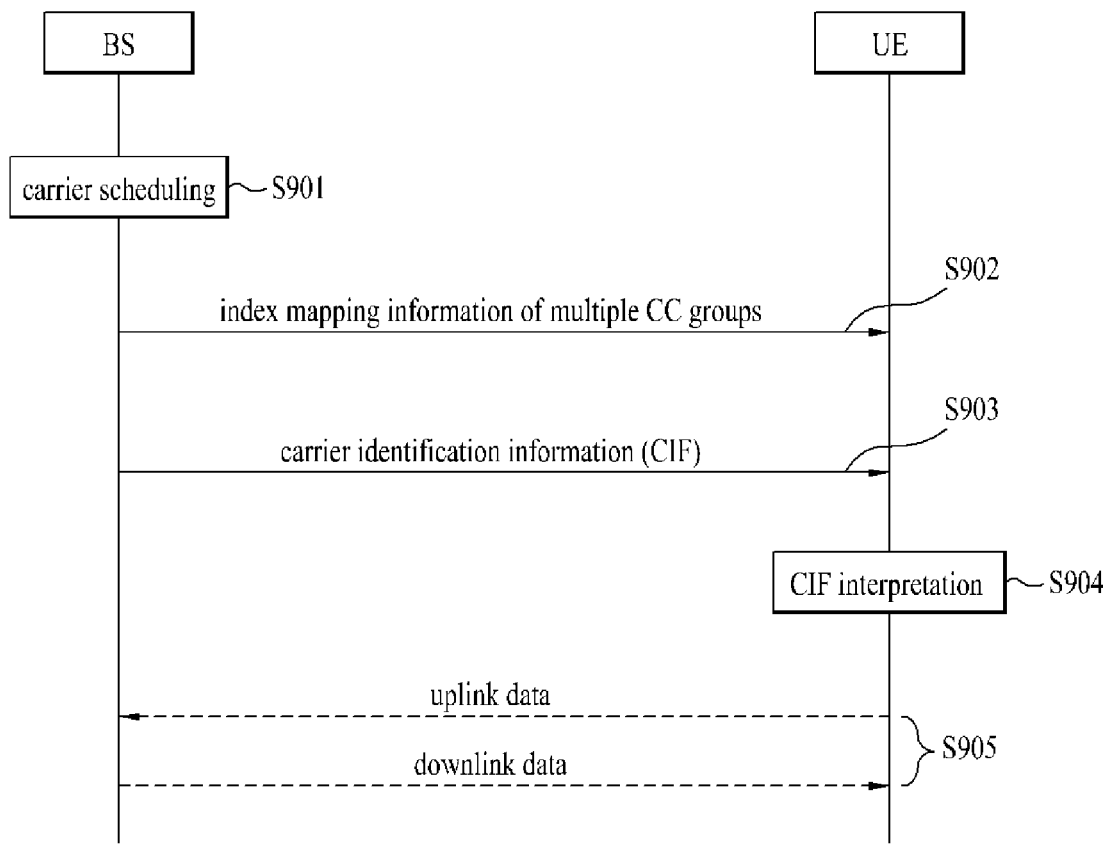
FIG. 9 is a flowchart illustrating a method for allowing a base station (BS) to transmit carrier identification information regarding carrier scheduling to a user equipment (UE) according to one embodiment of the present invention.

Therefore, in the case of scheduling several CC groups (or several PDCCHs), a bit value established at a CIF constructed for any one group can be utilized as identification information of a carrier belonging to another CC group. FIG. 9 is a flowchart illustrating a method for allowing a BS to transmit carrier identification information regarding carrier scheduling to a UE according to one embodiment of the present invention.

Referring to FIG. 9, the BS according to one embodiment of the present invention schedules carrier or carrier aggregation to be used by the corresponding UE in step S901.

In this case, the BS may define a new CIF so as to transmit control information of multiple carrier groups on downlink or uplink. For example, the number of bits allocated to a CIF is newly defined on the basis of any one DL CC group from among a plurality of DL CC groups used by the UE, and a bit value established in the defined CIF may be reused as scheduling information of another DL CC group. In this case, the newly defined CIF may be considered to be a PDCCH scheduling CC-specific CIF.

For example, provided that scheduling information of the CC group A including DL CCs (DL CC1~DL CC10) is transmitted through a DL CC1, and scheduling information of a CC Group B including DL CCs (DL CC11~DL CC20) not jointed with a CC Group A through a DL CC11, although CIF values transmitted through DL CC1 and DL CC1 are set to the same value, DL CCs specified in respective groups are distinguished from each other. That is, provided that a DL CC 1 is set to a reference CC of the CC group A and an offset value based on the CIF is set to 8 in the CC group A, a specific DL CC can be interpreted as identification information of a DL CC9. In this case, provided that the same CIF value is applied to a CC group B, the corresponding information can be reinterpreted as identification information of a DL CC 19 on the basis of a DL CC11. Therefore, at least two CCs can be indicated by a CIF value transmitted through one DL CC. Thereafter, the BS transmits carrier or carrier aggregation configuration information to the UE, and at the same time index mapping information of multiple CCs capable of being applied to the corresponding UE can also be transmitted in step S902. Likewise, the CC index mapping information can be transmitted through additional higher layer signaling before or after transmitting configuration information of the carrier aggregation.

Thereafter, the BS configures a CIF applicable to different CC groups to be used in the corresponding UE, and transmits the CIF to the UE through a DL CC in step S903. In this case, carrier identification information contained in the CIF may be denoted by an offset value calculated on the basis of a reference carrier index.

The UE having received the CIF interprets the received CIF on the basis of the pre-transmitted CC index mapping information, such that it can derive either carrier information of either at least one CC group or each CC group capable of being used by the UE on downlink or uplink in step S904. That is, the same CIF value is interpreted as carrier identification information of the CC group A, and at the same time the corresponding information can be reinterpreted as carrier identification information of another CC group B.

Thereafter, the UE may receive downlink data through at least one DL CC group indicated by the received CIF or may transmit uplink data through at least one UL CC group in step S905.

The reference carrier decision scheme and the offset value decision scheme of the first embodiment can also be applied to the third embodiment of the present invention.

The base station (BS) and the user equipment (UE) applicable to embodiments of the present invention will hereinafter be described with reference to FIG. 10.

Figure 10:
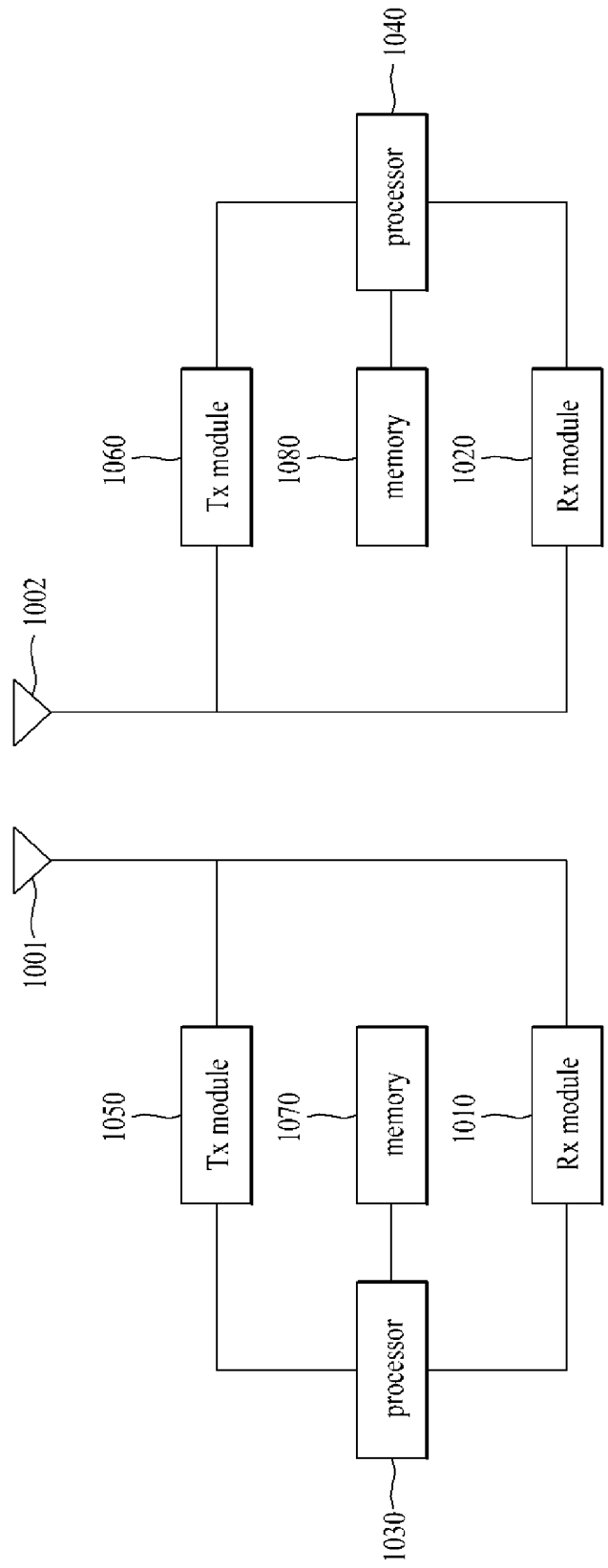
FIG. 10 is a block diagram illustrating a base station (BS) and a user equipment (UE) according to one embodiment of the present invention.

FIG. 10 is a block diagram illustrating a base station (BS) and a user equipment (UE) according to one embodiment of the present invention.

Referring to FIG. 10, the UE may operate as a transmitter on uplink and as a receiver on downlink, while the BS may operate as a receiver on uplink and as a transmitter on downlink. That is, each of the UE and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc.

Referring to FIG. 10, the left part corresponds to the transmitter (i.e., the BS) and the right part corresponds to the receiver (i.e., the UE). Each of the transmitter and the receiver may include an antenna 1001 or 1002, a Reception (Rx) module 1010 or 1020, a processor 1030 or 1040, a Transmission (Tx) module 1050 or 1060, and a memory 1070 or 1080.

The antennas 1001 and 1002 include Tx antennas for transmitting signals generated from Tx modules 1050 and 1060 to an external part, and Rx antennas for receiving radio frequency (RF) signals from the external part and providing the received RF signals to the Rx modules 1010 and 1020. If Multiple Input Multiple Output (MIMO) is supported, two or more antennas may be provided.

The Rx modules 1010 and 1020 may recover original data by demodulating and decoding data received through the antennas 1001 and 1002 and provide the recovered data to the processors 1030 and 1040. Although the Rx modules and the antennas may be separated from each other as shown in FIG. 10, it should be noted that the Rx modules and the antennas may also be denoted only by the receiver for receiving RF signals.

The processors 1030 and 1040 generally provide overall control to the transmitter or the receiver. Especially, the processors 1030 and 1040 may perform a controller function for implementing the above-described exemplary embodiments of the present invention, a variable MAC frame control function based on service characteristics and a propagation environment, a handover (HO) function, an authentication and encryption function, etc.

The Tx modules 1050 and 1060 perform predetermined coding and modulation for data, which is scheduled by schedulers connected to the processors 1030 and 1040 and transmitted to the outside, and then transfer the modulated data to the antennas 1001 and 1002. The Tx modules and the antennas may be separated from each other as shown in FIG. 10, it should be noted that the Tx modules and the antennas may also be denoted only by the transmitter for transmitting RF signals.

The memories 1070 and 1080 may store programs for processing and control of the processors 1030 and 1040, temporarily store input/output data (uplink (UL) grant, system information, station identifier (STID), flow identifier (FID), action time, etc. in case of the UE).

In addition, each of the memories 1070 and 1080 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The processor 1030 of the transmitter performs overall control of the BS. In accordance with the embodiments shown in FIGS. 7 to 9, carrier scheduling of each UE located in the cell is performed, and at the same time the CIF for transmitting the location information of a carrier allocated to each UE can also be configured.

The CIF is a field including carrier index information. In accordance with the embodiments of the present invention, the CIF may be denoted by an offset value related to a carrier index, such that the location information of DL CC and UL CC can be denoted through one CIF. Through one CIF, an index offset value of each carrier contained in at least two CC groups discriminated in DL or UL can be indicated.

The processor 1030 of the transmitter generates mapping information for mapping carriers allocated to individual UEs to a CIF, reference carrier information used as a reference of the offset value, and control information regarding control information of either carrier or carrier aggregation configuration, and transmits the generated information to the receiver through the transmission (Tx) module 1050.

In addition, the transmitter may transmit a carrier including the CIF configured in the processor 1030 to the receiver through the transmission (Tx) module 1050.

The processor 1040 of the receiver provides overall control to the UE, and recognizes location information of a specific carrier by interpreting the received CIF.

The processor 1040 of the receiver provides overall control to the UE. In addition, according to the embodiments of FIGS. 7 to 9, the CIF received thorugh the reception (Rx) module 1020 is interpreted such that the BS may derive location information of a specific carrier allocated to the corresponding UE. In this case, the processor 1040 of the receiver may differently perform the method for counting a carrier index offset value contained in the CIF according to the carrier type.

In addition, the processor 1040 of the receiver recognizes the location information of the downlink carrier through CIF interpretation, such that it can receive downlink data transmitted through the corresponding carrier from the transmitter. Likewise, uplink data may also be transmitted to the transmitter through the corresponding carrier on the basis of the location information of an uplink carrier recognized through the CIF interpretation.

In accordance with the embodiments of the present invention, the processors 1030 and 1040 may be configured to transmit the above-mentioned control information through additional signaling instead of a DM-RS. In the meantime, the BS may perform a control function for implementing the above-described exemplary embodiments of the present invention, Orthogonal Frequency Division Multiple Access (OFDMA) packet scheduling, Time Division Duplexing (TDD) packet scheduling and channelization, a variable MAC frame control function based on service characteristics and propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to various wireless access systems including a 3$^{rd}$ Generation Partnership Project (3GPP) system, a 3GPP2 system, and/or an Institute of Electrical and Electronic Engineers (IEEE) 802.xx system. Besides these wireless access systems, the embodiments of the present invention are applicable to all technical fields to which wireless access systems are applied.

The invention claimed is:

1. A method for receiving a signal by a user equipment (UE) in a wireless communication system supporting multiple component carriers (CCs), the method comprising:
   receiving, by the UE from a base station (BS), information including an index of a reference CC which is UE-specifically determined by the BS among the multiple CCs so that the reference CC can be different between different UEs located in a cell;
   receiving, by the UE, a subframe including a plurality of orthogonal frequency division multiplexing (OFDM) symbols from the BS; and
   receiving, by the UE through one or more contiguous OFDM symbols within the subframe from the BS, scheduling information associated with a specific component carrier (CC) allocated to the UE, and a carrier indication field (CIF) which includes an offset value used to identify the specific CC,
   wherein a first part and a second part of all values to be represented by the CIF have been pre-allocated for downlink CCs and uplink CCs, respectively, so that the CIF is also used to identify whether the specific CC is either a downlink CC or an uplink CC, and
   wherein the offset value is equal to a difference between an index of the specific CC and the index of the reference CC.

2. The method according to claim 1, further comprising:
   receiving index mapping information related to an index mapping rule of multiple CCs used in the UE according to carrier scheduling, from the BS,
   wherein the UE obtains location information of the specific CC using the index mapping information and the offset value included in the CIF for the specific CC.

3. The method according to claim 2, wherein the index mapping rule of the multiple CCs includes a sequentially indexed mapping rule in which indexing is performed considering whether the multiple CCs correspond to uplink or downlink, and an arbitrarily indexed mapping rule in which indexing is performed without discriminating between uplink and downlink.

4. A method for transmitting a signal by a base station (BS) in a wireless communication system supporting multiple component carriers (CCs), the method comprising:
   transmitting, by the BS, information including an index of a reference CC which is user equipment (UE)-specifically determined by the BS among the multiple CCs so that the reference CC can be different between different UEs located in a cell;
   scheduling, by the BS, a plurality of CCs used by a UE; and
   transmitting, by the BS through one or more contiguous orthogonal frequency division multiplexing (OFDM) symbols within a subframe to the UE, scheduling information associated with a specific CC allocated to the UE, and a carrier indication field (CIF) which includes an offset value used to identify the specific CC,
   wherein a first part and a second part of all values to be represented by the CIF have been pre-allocated for downlink CCs and uplink CCs, respectively, so that the CIF is also used to identify whether the specific CC is either a downlink CC or an uplink CC, and
   wherein the offset value is equal to a difference between an index of the specific CC and the index of the reference CC.

5. The method according to claim 4, further comprising transmitting index mapping information related to an index mapping rule of multiple CCs depending on carrier scheduling, to the UE.

6. The method according to claim 5, wherein the index mapping rule of the multiple CCs includes a sequentially indexed mapping rule in which indexing is performed considering whether the multiple CCs correspond to uplink or downlink, and an arbitrarily indexed mapping rule in which indexing is performed without discriminating between uplink and downlink.

7. A user equipment (UE) for use in a wireless communication system supporting multiple carriers, the UE comprising:
   a receiver configured to receive a radio frequency (RF) signal; and
   a processor configured to:
   receive, through the receiver, information including an index of a reference component carrier (CC) which is UE-specifically determined by a base station (BS) among multiple CCs so that the reference CC can be different between different UEs located in a cell, scheduling information associated with a specific CC allocated to the UE, and a carrier indication field (CIF) which includes an offset value used to identify the specific CC through one or more contiguous orthogonal frequency division multiplexing (OFDM) symbols within a subframe including a plurality of OFDM symbols received from the BS,
   wherein a first part and a second part of all values to be represented by the CIF have been pre-allocated for downlink CCs and uplink CCs, respectively, so that the CIF is also used to identify whether the specific CC is either a downlink CC or an uplink CC,
   acquire location information of the specific CC using index mapping information related to an index mapping rule of multiple CCs used in the UE, and
   transmit and receive a signal through the specific CC,
   wherein the offset value is equal to a difference between an index of the specific CC and the index of the reference CC.

8. The UE according to claim 7, wherein the processor determines whether the specific CC corresponds to uplink or downlink using the index mapping information and the offset value included in the CIF for the specific CC.

9. The UE according to claim 8, wherein the index mapping rule of the multiple CCs includes a sequentially indexed mapping rule in which indexing is performed considering whether the multiple CCs correspond to uplink or downlink, and an arbitrarily indexed mapping rule in which indexing is performed without discriminating between uplink and downlink.

10. A base station (BS) for use in a wireless communication system supporting multiple carriers, the BS comprising:
- a transmitter configured to transmit a radio frequency (RF) signal; and
- a processor configured to:
  - map indexes of multiple component carriers (CCs) used in a user equipment (UE) according to carrier scheduling, and
  - construct scheduling information associated with a specific CC allocated to the UE, and a carrier indication field (CIF) which includes an offset value used to identify the specific CC among the multiple CCs,
- wherein the processor is further configured to transmit, through the transmitter, information including an index of a reference CC which is user equipment (UE)-specifically determined by the processor among the multiple CCs so that the reference CC can be different between different UEs located in a cell, the scheduling information, the CIF and index mapping information of the multiple CCs to the UE through one or more contiguous orthogonal frequency division multiplexing (OFDM) symbols within a subframe including a plurality of OFDM symbols, wherein a first part and a second part of all values to be represented by the CIF have been pre-allocated for downlink CCs and uplink CCs, respectively, so that the CIF is also used to identify whether the specific CC is either a downlink CC or an uplink CC, and
- wherein the offset value is equal to a difference between an index of the specific CC and the index of the reference CC.

11. The BS according to claim 10, wherein an index mapping rule of the multiple CCs includes a sequentially indexed mapping rule in which indexing is performed considering whether the multiple CCs correspond to uplink or downlink, and an arbitrarily indexed mapping rule in which indexing is performed without discriminating between uplink and downlink.

* * * * *